US011171526B2

(12) United States Patent
Hong et al.

(10) Patent No.: US 11,171,526 B2
(45) Date of Patent: Nov. 9, 2021

(54) ENERGY EFFICIENT PERMANENT MAGNET SYNCHRONOUS MOTOR

(71) Applicant: THE BOARD OF TRUSTEES OF THE UNIVERSITY OF ALABAMA, Tuscaloosa, AL (US)

(72) Inventors: Yang-Ki Hong, Tuscaloosa, AL (US); Hoyun Won, Montgomery, AL (US); Woncheol Lee, Tuscaloosa, AL (US)

(73) Assignee: The Board of Trustees of the University of Alabama, Tuscaloosa, AL (US)

( * ) Notice: Subject to any disclaimer, the term of this patent is extended or adjusted under 35 U.S.C. 154(b) by 140 days.

(21) Appl. No.: 16/580,938

(22) Filed: Sep. 24, 2019

(65) Prior Publication Data

US 2020/0112211 A1    Apr. 9, 2020

Related U.S. Application Data

(60) Provisional application No. 62/735,541, filed on Sep. 24, 2018.

(51) Int. Cl.
*H02K 1/27*     (2006.01)
*H02K 21/14*    (2006.01)
*H02K 21/04*    (2006.01)
*H02K 3/28*     (2006.01)

(52) U.S. Cl.
CPC ............ *H02K 1/276* (2013.01); *H02K 1/278* (2013.01); *H02K 21/145* (2013.01); *H02K 3/28* (2013.01); *H02K 21/046* (2013.01)

(58) Field of Classification Search
CPC ...... H02K 1/276; H02K 21/145; H02K 1/278; H02K 21/046; H02K 3/28; H02K 21/24; H02K 21/14; H02K 1/2793; H02K 1/2766; H02K 16/04; Y02T 10/64; H02P 27/06; H02P 27/08; H02P 25/22; B60L 2220/14
USPC ................................ 310/112, 114, 266, 268
See application file for complete search history.

(56) References Cited

U.S. PATENT DOCUMENTS

| | | | |
|---|---|---|---|
| 6,373,162 B1 * | 4/2002 | Liang | H02K 1/2793 310/112 |
| 2005/0151437 A1 * | 7/2005 | Ramu | H02K 21/12 310/114 |
| 2008/0103632 A1 * | 5/2008 | Saban | H02K 21/48 700/286 |

(Continued)

*Primary Examiner* — Thomas Truong
(74) *Attorney, Agent, or Firm* — Meunier Carlin & Curfman LLC (57) ABSTRACT

Various implementations include an electric motor including an annular radial stator, an annular axial stator, and a rotor. The annular radial stator has an opening with an inner surface and distributed windings disposed along at least the inner surface of the opening. The annular axial stator has concentrated windings disposed along at least a first side of the axial stator. The rotor includes two or more magnets. Flux from the two or more magnets interacts with one or both of a magnetic field created by the radial stator windings or axial rotor windings. The rotor is disposed within the radial stator opening and the axes of the axial stator and radial stator are coincident with the rotor axis. The flux interacting with one or both of the radial stator magnetic field or the axial stator magnetic field turns the rotor about the rotor axis.

33 Claims, 8 Drawing Sheets

(56) References Cited

U.S. PATENT DOCUMENTS

2013/0099618 A1\* 4/2013 Kusase .................. H02K 23/38
310/156.56
2018/0323665 A1\* 11/2018 Chen ....................... H02P 21/16

\* cited by examiner

ENERGY EFFICIENT PERMANENT MAGNET SYNCHRONOUS MOTOR

BACKGROUND

In electric vehicle ("EV") operation, the operating efficiency region of a traction motor changes continuously under the diversity of driving conditions from country to congested city driving, to inter-city highway driving, to freeway driving. Therefore, rotational speed and torque loads of the motor are dependent upon the driving conditions. The conventional traction motor cannot provide the desired optimal efficiency region for all conditions due to inflexible optimal efficiency regions. Thus, maximum driving distance is reduced.

To address this issue, several approaches have been introduced. Winding-changing motors ("WCM"), magnet pole-changing motors ("MPCM"), and mechanical-assisted motors ("MAM") showed improvement in the overall efficiency of the motor by shifting efficiency between two high-efficiency regions (above 92%). However, the WCM suffers from a short operating time at the high speed. This short time is a result of the temperature of the motor increasing rapidly since the high-speed region requires high current. The MPCM also provides two high-efficiency areas in torque-speed relation by varying the magnetizing direction of the permanent magnets ("PM"). However, changing magnetizing direction of the PMs during driving may result in jerking due to unstable flux flow. Furthermore, the moving parts of the MPCMs require frequent maintenance for replacing brushes and slip rings for the DC coil. Lastly, the MAM uses a mechanical actuator to improve motor efficiency at high speeds by offsetting the center of the magnetic poles. However, its torque density is not enough for EV application.

Thus, there is a need for an energy-efficient electric motor with high torque density and minimal moving parts.

BRIEF SUMMARY

Various implementations include an electric motor. The electric motor, according to some implementations, includes an annular radial stator, an annular axial stator, and a rotor. The annular radial stator has a radial stator axis and an opening. The opening has an inner surface and distributed windings disposed along at least the inner surface of the opening. The annular axial stator has an axial stator axis, a first side and a second side being spaced apart and opposite each other, and concentrated windings disposed along at least the first side of the axial stator. The rotor has a rotor axis and includes two or more magnets. Flux from the two or more magnets interacts with one or both of a radial stator magnetic field created by a current flowing through the distributed windings disposed along at least the inner surface of the opening of the radial stator or an axial stator magnetic field created by a current flowing through the concentrated windings disposed along at least the first side of the axial stator. The rotor is disposed within the radial stator opening and the axial stator axis and radial stator axis are coincident with the rotor axis. The flux interacting with one or both of the radial stator magnetic field or the axial stator magnetic field turns the rotor about the rotor axis.

In some implementations, the rotor is cylindrical and has a first end, a second end, an outer surface, and a central opening. The outer surface and the central opening extend between the first end and the second end. The two or more magnets include two or more inner magnets and two or more outer magnets. Each inner magnet is disposed radially between the central opening and the outer surface of the cylindrical rotor and has an outer radial end. The two or more inner magnets are circumferentially space apart. Each outer magnet is disposed radially between the outer radial ends of all of the two or more inner magnets and the outer surface of the cylindrical rotor. The two or more outer magnets are circumferentially space apart.

In some implementations, the rotor defines at least four magnet openings, and the two or more inner magnets and two or more outer magnets are disposed within the two or more magnet openings.

In some implementations, the two or more inner magnets have a magnetic flux direction. The magnetic flux direction of the two or more inner magnets are radially directed toward either the first end or the second end of the rotor, and the magnetic flux direction of circumferentially adjacent inner magnets are opposite from each other.

In some implementations, the two or more outer magnets have magnetic flux directions. The magnetic flux directions have a radial component. The radial component of the magnetic flux directions of the outer magnets within the same opening are both directed radially inwardly or outwardly, and the radial component of the magnetic flux directions of the outer magnets in circumferentially adjacent magnet openings are opposite from each other.

In some implementations, at least one of the magnet openings is a v-shaped magnet opening, and two outer magnets are disposed within the v-shaped magnet opening.

In some implementations, the two or more inner magnets include eight inner magnets.

In some implementations, the two or more outer magnets include sixteen outer magnets.

In some implementations, the two or more inner magnets are disposed adjacent the concentrated windings of the axial stator.

In some implementations, the two or more outer magnets are disposed adjacent the distributed windings of the radial stator.

In some implementations, the electric motor includes a switch for directing current to the distributed windings of the radial stator, the concentrated windings of the axial stator, or both.

Various other implementations include an electric motor system. The electric motor system, according to some implementations, includes an electric motor, a power system, a switch, and a control system. The electric motor includes an annular radial stator, an annular axial stator, and a rotor. The annular radial stator has a radial stator axis and an opening. The opening has an inner surface and distributed windings disposed along at least the inner surface of the opening. The annular axial stator has an axial stator axis, a first side and a second side being spaced apart and opposite each other, and concentrated windings disposed along at least the first side of the axial stator. The rotor has a rotor axis and includes two or more magnets. Flux from the two or more magnets interacts with one or both of a radial stator magnetic field created by a current flowing through the distributed windings disposed along at least the inner surface of the opening of the radial stator or an axial stator magnetic field created by a current flowing through the concentrated windings disposed along at least the first side of the axial stator. The rotor is disposed within the radial stator opening and the axial stator axis and radial stator axis are coincident with the rotor axis. The flux interacting with one or both of the radial stator magnetic field or the axial stator magnetic field turns the rotor about the rotor axis. The power system includes a direct current battery and an inverter for changing the direct current from the battery into alternating current. The switch directs the current from the power system to the distributed windings of the radial stator, the concentrated windings of the axial stator, or both. The control system controls the inverter and the switch.

In some implementations, the rotor is cylindrical and has a first end, a second end, an outer surface, and a central opening. The outer surface and the central opening extend between the first end and the second end. The two or more magnets include two or more inner magnets and two or more outer magnets. Each inner magnet is disposed radially between the central opening and the outer surface of the cylindrical rotor and has an outer radial end. The two or more inner magnets are circumferentially space apart. Each outer magnet is disposed radially between the outer radial ends of all of the two or more inner magnets and the outer surface of the cylindrical rotor. The two or more outer magnets are circumferentially space apart.

In some implementations, the rotor defines at least four magnet openings, and the two or more inner magnets and two or more outer magnets are disposed within the two or more magnet openings.

In some implementations, the two or more inner magnets have a magnetic flux direction. The magnetic flux direction of the two or more inner magnets are radially directed toward either the first end or the second end of the rotor, and the magnetic flux direction of circumferentially adjacent inner magnets are opposite from each other.

In some implementations, the two or more outer magnets have magnetic flux directions. The magnetic flux directions has a radial component. The radial component of the magnetic flux directions of the outer magnets within the same opening are both directed radially inwardly or outwardly, and the radial component of the magnetic flux directions of the outer magnets in circumferentially adjacent magnet openings are opposite from each other.

In some implementations, at least one of the magnet openings is a v-shaped magnet opening. Two outer magnets are disposed within the v-shaped magnet opening.

In some implementations, the two or more inner magnets include eight inner magnets.

In some implementations, the two or more outer magnets include sixteen outer magnets.

In some implementations, the two or more inner magnets are disposed adjacent the concentrated windings of the axial stator.

In some implementations, the two or more outer magnets are disposed adjacent the distributed windings of the radial stator.

Various other implementations include a method. The method, according to some implementations, includes providing an electric motor, energizing one of the radial stator and the axial stator, and energizing the other of the radial stator and the axial stator. The electric motor includes an annular radial stator, an annular axial stator, and a rotor. The annular radial stator has a radial stator axis and an opening. The opening has an inner surface and distributed windings disposed along at least the inner surface of the opening. The annular axial stator has an axial stator axis, a first side and a second side being spaced apart and opposite each other, and concentrated windings disposed along at least the first side of the axial stator. The rotor has a rotor axis and includes two or more magnets. Flux from the two or more magnets interacts with one or both of a radial stator magnetic field created by a current flowing through the distributed windings disposed along at least the inner surface of the opening of the radial stator or an axial stator magnetic field created by a current flowing through the concentrated windings disposed along at least the first side of the axial stator. The rotor is disposed within the radial stator opening and the axial stator axis and radial stator axis are coincident with the rotor axis. The flux interacting with one or both of the radial stator magnetic field or the axial stator magnetic field turns the rotor about the rotor axis.

In some implementations, the method includes deenergizing the one of the radial stator and the axial stator before energizing the other of the radial stator and the axial stator.

In some implementations, the radial stator is energized before the axial stator is energized.

In some implementations, the axial stator is energized before the radial stator is energized.

In some implementations, both the radial stator and the axial stator are energized at the same time.

In some implementations, the electric motor further includes a radial switch for energizing the radial stator and an axial switch for energizing the axial stator.

In some implementations, the rotor is cylindrical and has a first end, a second end, an outer surface, and a central opening. The outer surface and the central opening extend between the first end and the second end. The two or more magnets include two or more inner magnets and two or more outer magnets. Each inner magnet is disposed radially between the central opening and the outer surface of the cylindrical rotor and has an outer radial end. The two or more inner magnets are circumferentially spaced apart. Each outer magnet is disposed radially between the outer radial ends of all of the two or more inner magnets and the outer surface of the cylindrical rotor. The two or more outer magnets are circumferentially space apart.

In some implementations, the rotor defines at least four magnet openings, and the two or more inner magnets and two or more outer magnets are disposed within the two or more magnet openings.

In some implementations, the two or more inner magnets have a magnetic flux direction. The magnetic flux direction of the two or more inner magnets are radially directed toward either the first end or the second end of the rotor, and the magnetic flux direction of circumferentially adjacent inner magnets are opposite from each other.

In some implementations, the two or more outer magnets have magnetic flux directions. The magnetic flux directions have a radial component. The radial component of the magnetic flux directions of the outer magnets within the same opening are both directed radially inwardly or outwardly, and the radial component of the magnetic flux directions of the outer magnets in circumferentially adjacent magnet openings are opposite from each other.

In some implementations, at least one of the magnet openings is a v-shaped magnet opening, and two outer magnets are disposed within the v-shaped magnet opening.

In some implementations, the two or more inner magnets includes eight inner magnets.

In some implementations, the two or more outer magnets includes sixteen outer magnets.

In some implementations, the two or more inner magnets are disposed adjacent the concentrated windings of the axial stator.

In some implementations, the two or more outer magnets are disposed adjacent the distributed windings of the radial stator.

BRIEF DESCRIPTION OF DRAWINGS

Example features and implementations are disclosed in the accompanying drawings. However, the present disclosure is not limited to the precise arrangements and instrumentalities shown.

DETAILED DESCRIPTION

Various implementations include an electric motor. The electric motor, according to some implementations, includes an annular radial stator, an annular axial stator, and a rotor. The annular radial stator has a radial stator axis and an opening. The opening has an inner surface and distributed windings disposed along at least the inner surface of the opening. The annular axial stator has an axial stator axis, a first side and a second side being spaced apart and opposite each other, and concentrated windings disposed along at least the first side of the axial stator. The rotor has a rotor axis and includes two or more magnets. Flux from the two or more magnets interacts with one or both of a radial stator magnetic field created by a current flowing through the distributed windings disposed along at least the inner surface of the opening of the radial stator or an axial stator magnetic field created by a current flowing through the concentrated windings disposed along at least the first side of the axial stator. The rotor is disposed within the radial stator opening and the axial stator axis and radial stator axis are coincident with the rotor axis. The flux interacting with one or both of the radial stator magnetic field or the axial stator magnetic field turns the rotor about the rotor axis.

Various other implementations include an electric motor system. The electric motor system, according to some implementations, includes the electric motor discussed above, a power system, a switch, and a control system. The power system includes a direct current battery and an inverter for changing the direct current from the battery into alternating current. The switch directs the current from the power system to the distributed windings of the radial stator, the concentrated windings of the axial stator, or both. The control system controls the inverter and the switch.

Various other implementations include a method. The method, according to some implementations, includes (1) providing the electric motor discussed above, (2) energizing one of the radial stator and the axial stator, and (3) energizing the other of the radial stator and the axial stator.

Figure 1A:
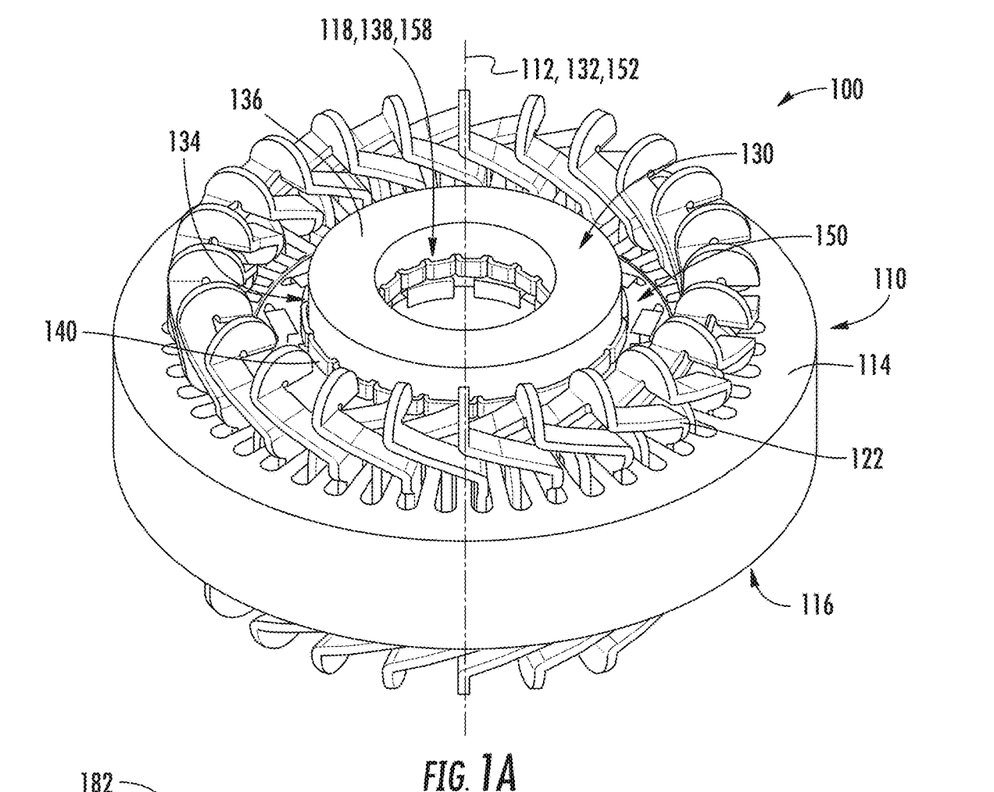
FIGS. 1A-C are perspective views of the electric motor in accordance with one implementation.
Figure 1B:
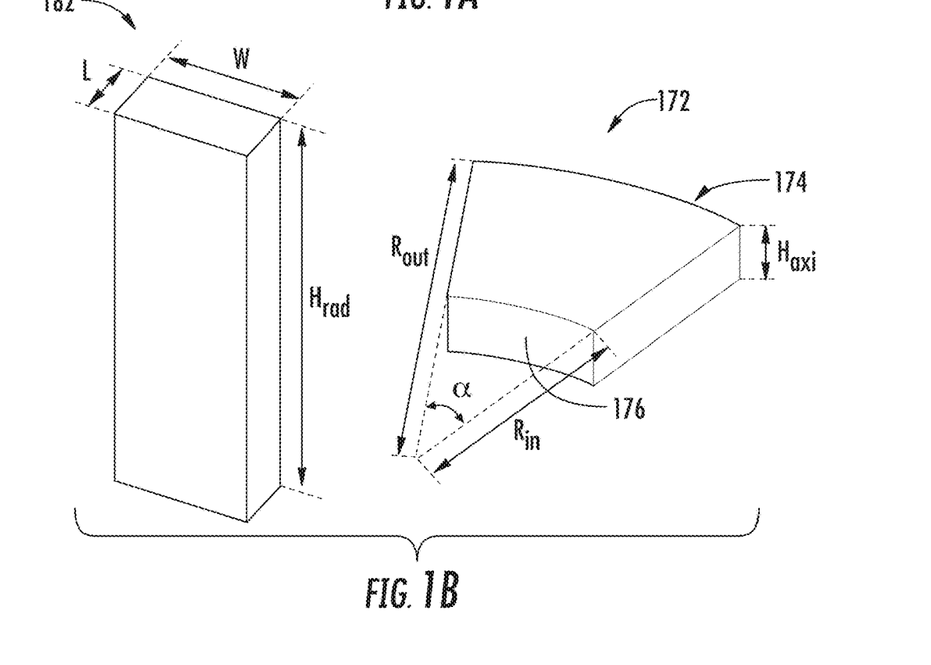
Figure 1C:
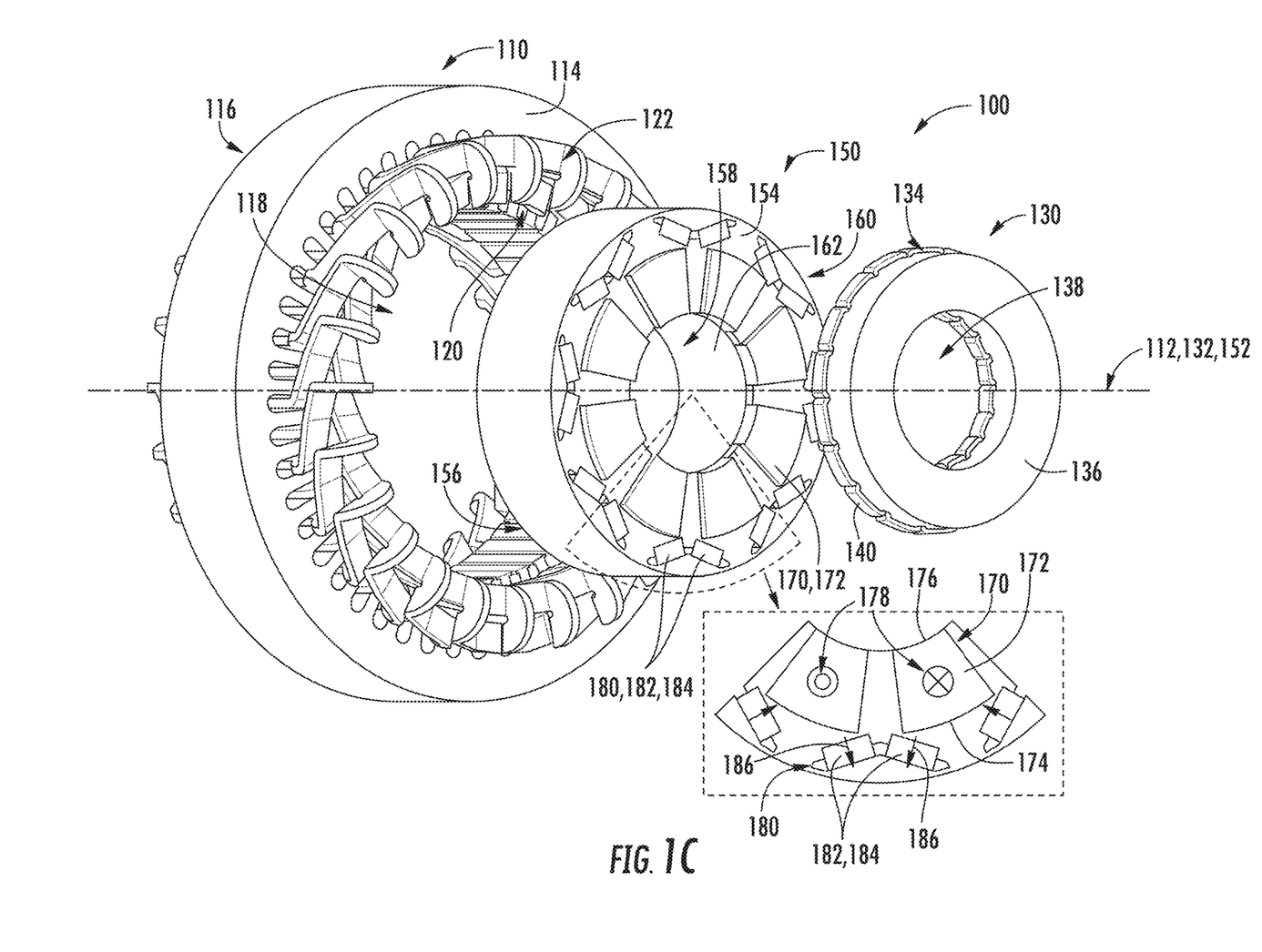

FIGS. 1A-C shows one implementation of an electric motor 100 with a radial stator 110, an axial stator 130, and a rotor 150. The electric motor 100 is an efficiency-shifting radial-axial hybrid permanent magnet synchronous motor ("ES-RA-HPMSM"). The radial stator 110 is annular and has a radial stator axis 112. The radial stator 110 also has a first side 114 and a second side 116 opposite and spaced apart from the first side 114. The first side 114 of the radial stator 110 defines an opening 118 extending from the first side 114 of the radial stator 110 to the second side 116 of the radial stator 110. The opening 118 of the radial stator 110 defines an inner surface 120, and distributed windings 122 are disposed along the inner surface 120 of the opening 118 of the radial stator 110. The opening 118 has a diameter large enough such that the rotor 150 can be disposed within the opening 118, as discussed below.

The axial stator 130 is annular and has an axial stator axis 132. The axial stator 130 also has a first side 134 and a second side 136 opposite and spaced apart from the first side 134. The first side 134 of the axial stator 130 defines an opening 138 extending from the first side 134 of the axial stator 130 to the second side 136 of the axial stator 130. Concentrated windings 140 are disposed along the first side 134 of the axial stator 130.

The rotor 150 is cylindrical and has a rotor axis 152. The rotor 150 has a first end 154 and a second end 156 opposite and spaced apart from the first end 154. The first end 154 and second end 156 of the rotor 150 are both perpendicular to the rotor axis 152. The first end 154 of the rotor 150 defines a central opening 158 extending from the first end 154 of the rotor 150 to the second end 156 of the rotor 150. The rotor 150 also has an outer surface 160 radially opposite and spaced apart from the inner surface 162 of the central opening 158 and extending from the first end 154 of the rotor 150 to the second end 156 of the rotor 150.

The first end 154 of the rotor 150 also defines eight inner magnet openings 170 extending from the first end 154 of the rotor 150 to the second end 156 of the rotor 150. The inner magnet openings 170 are circumferentially spaced apart around the rotor axis 152 and located radially between the central opening 158 and the outer surface 160 of the rotor 150. The rotor 150 further includes eight inner magnets 172. Each of the eight inner magnets 172 in FIGS. 1A-C are $Nd_2Fe_{14}B$ ("Nd—Fe—B") permanent magnets ("PMs"), however in other implementations, the inner magnets can be any other suitable magnet, for example, $SrFe_{12}O_{19}$, low temperature phase (LTP)-MnBi, or any other suitable PM. The Nd—Fe—B PMs possesses remnant flux density (Br) of 1.23 T and coercivity (Hc) of −890 kA/m. Each of the inner magnets 172 in FIGS. 1A-C has an outer radius (Rout) of 133.3 mm, inner radius (Rin) of 73.5 mm, height (Haxi) of 20 mm, and arc angle (α) of 31.5°, but in other implementations, the inner magnets have any other dimensions. Each of the inner magnets 172 is disposed within an inner magnet opening 170 such that each of the inner magnets 172 are circumferentially spaced apart and disposed radially between the central opening 158 and the outer surface 160 of the rotor 150. Each of the inner magnets 172 has an outer radial end 174 and an inner radial end 176 opposite and spaced apart from the outer radial end 174. The outer radial end 174 of each of the inner magnets 172 is disposed closer than the inner radial end 176 of the inner magnet 172 to the outer surface 160 of the rotor 150. The rotor 150 of FIGS. 1A-C has eight inner magnet openings 170 and eight inner magnets 172, but in other implementations, the rotor could have any number of two or more inner magnet openings and two or more inner magnets.

The first end 154 of the rotor 150 also defines eight outer magnet openings 180 extending from the first end 154 of the rotor 150 to the second end 156 of the rotor 150. The outer magnet openings 180 are circumferentially spaced apart around the rotor axis 152 and located radially between the outer radial ends 174 of all of the inner magnets 172 and the outer surface 160 of the rotor 150. The outer magnet openings 180 in FIGS. 1A-C are v-shaped in a plane parallel to the first end 154 of the rotor 150, however, in other implementations, the outer magnet openings are any other shape in the plane parallel to the first end of the rotor, for example, circular, ovular, triangular, rectangular, square, or any other shape capable of having outer magnets disposed within them. The rotor 150 further includes sixteen outer magnets 182. Like the inner magnets 172, each of the sixteen outer magnets 182 in FIGS. 1A-C are Nd—Fe—B PMs, however in other implementations, the inner magnets can be any other suitable magnet, for example, $SrFe_{12}O_{19}$, low temperature phase (LTP)-MnBi, or any other suitable PM. The outer magnets 182 in FIGS. 1A-C each have a width (W) of 17.8 mm, length (L) of 8.4 mm, and height (Hrad) of 100 mm, but in other implementations, the inner magnets have any other dimensions. Two outer magnets 182 are disposed as a pair of outer magnets 184 within each outer magnet opening 180 such that each pair of outer magnets 184 are circumferentially spaced apart and disposed radially between the outer radial ends 174 of all of the inner magnets 172 and the outer surface 160 of the rotor 150. The rotor 150 of FIGS. 1A-C has eight outer magnet openings 180 and sixteen outer magnets 182 (eight pairs of outer magnets 184), but in other implementations, the rotor has have any number of two or more outer magnet openings and two or more outer magnets. Although the outer magnet openings 180 shown in FIGS. 1A-C have a pair of outer magnets 184 disposed within each of the outer magnet openings 180, in other implementations, the outer magnet openings have any other number of magnets disposed within each of the outer magnet openings.

Each of the eight inner magnets 172 have a magnetic flux direction 178, and each of the sixteen outer magnets 182 have a magnetic flux direction 186. The magnetic flux direction 178 of each of the inner magnets 172 is radially directed toward either the first end 154 or the second end 156 of the rotor 150, and the magnetic flux directions 178 of circumferentially adjacent inner magnets 172 are opposite from each other. The magnetic flux direction 186 of each of the outer magnets 182 have a radial component, and the radial component of the magnetic flux directions 186 of the outer magnets 182 within the same outer magnet opening 180 are both directed radially inwardly or outwardly, and the radial component of the magnetic flux directions 186 of the outer magnets 182 in circumferentially adjacent outer magnet openings 180 are opposite from each other. The magnetic flux direction 186 of each of the outer magnets 182 also has a circumferential component, and the circumferential component of the magnetic flux directions 186 of the outer magnets 182 within the same outer magnet opening 180 are both directed circumferentially toward each other or away from each other, and the circumferential component of the magnetic flux directions 186 of circumferentially adjacent pairs of outer magnets 184 are opposite from each other. Thus, the magnetic flux directions 186 of the outer magnets 182 in each pair of outer magnets 184 is either directed inwardly with respect to their respective v-shaped outer magnet opening 180 or directed outwardly with respect to their respective v-shaped outer magnet opening 180.

The rotor 150 is disposed within the radial stator opening 118 such that the rotor axis 152 and the radial stator axis 112 are coincident. Each of the outer magnets 182 is disposed adjacent the distributed windings 122 of the radial stator 110. When the distributed windings 122 disposed along the inner surface 120 of the opening 118 of the radial stator 110 are activated, the magnetic field created by the distributed windings 122 interacts with the magnetic flux created by the outer magnets 182 to turn the rotor 150 about the rotor axis 152.

The first side 134 of the axial stator 130 is disposed adjacent the first end 154 of the rotor 150, and the axial stator axis 132 is coincident with the rotor axis 152. Each of the inner magnets 172 is disposed adjacent the concentrated windings 140 of the axial stator 130. When the concentrated windings 140, disposed along the first side 134 of the axial stator 130, are activated, the magnetic field created by the concentrated windings 140 interacts with the magnetic flux created by the inner magnets 172 to turn the rotor 150 about the rotor axis 152.

Figure 2:
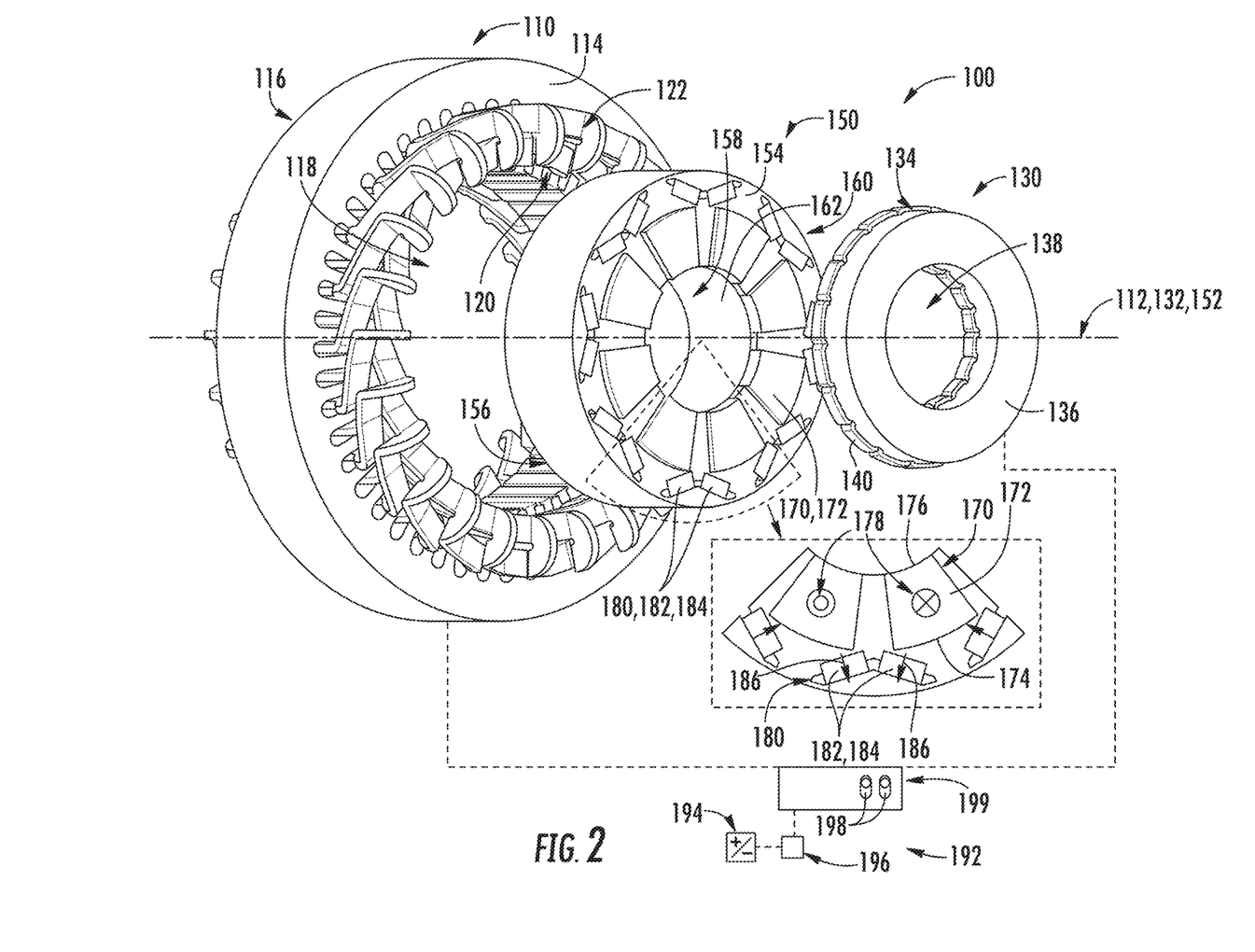
FIG. 2 is a perspective view of electric motor system including the electric motor, in accordance with the implementation of FIGS. 1A-C.

FIG. 2 shows an electric motor system 190 including an electric motor 100, a power system 192, a switch 198, and a control system 199. The electric motor 100 has all of the features shown in FIGS. 1A-C and described above. The power system 192 includes a direct current battery 194 and an inverter 196 for changing the direct current from the battery 194 into alternating current. The switch 198 can be toggled to direct the current from the power system 192 to the distributed windings 122 of the radial stator 110, the concentrated windings 140 of the axial stator 130, or both. The control system 199 is used to control the inverter 196 and the switch 198.

In use, the electric motor 100 or electric motor system 190 described above, and shown in FIGS. 1A-C and 2, can operate to provide energy-efficient, high torque density with minimal moving parts. First, the radial stator 110 is energized. Next, the axial stator 130 is energized while the radial stator 110 is simultaneously deenergized such that only the axial stator 130 is energized. Then, the radial stator 110 is reenergized while the axial stator 130 remains energized such that both the radial stator 110 and the axial stator 130 are energized at the same time.

In another method of operating the electric motor 100 or electric motor system 190 described above, and shown in FIGS. 1A-C and 2, the axial stator 130 is energized first. Next, the radial stator 110 is energized while the axial stator 130 is simultaneously deenergized such that only the radial stator 110 is energized. Then, the axial stator 130 is reenergized while the radial stator 110 remains energized such that both the radial stator 110 and the axial stator 130 are energized at the same time.

In another method of operating the electric motor 100 or electric motor system 190 described above, and shown in FIGS. 1A-C and 2, either the radial stator 110 or axial stator 130 is energized first. Then, the other of the radial stator 110 or axial stator 130 is energized such that both the radial stator 110 and the axial stator 130 are energized at the same time.

Figure 3A:
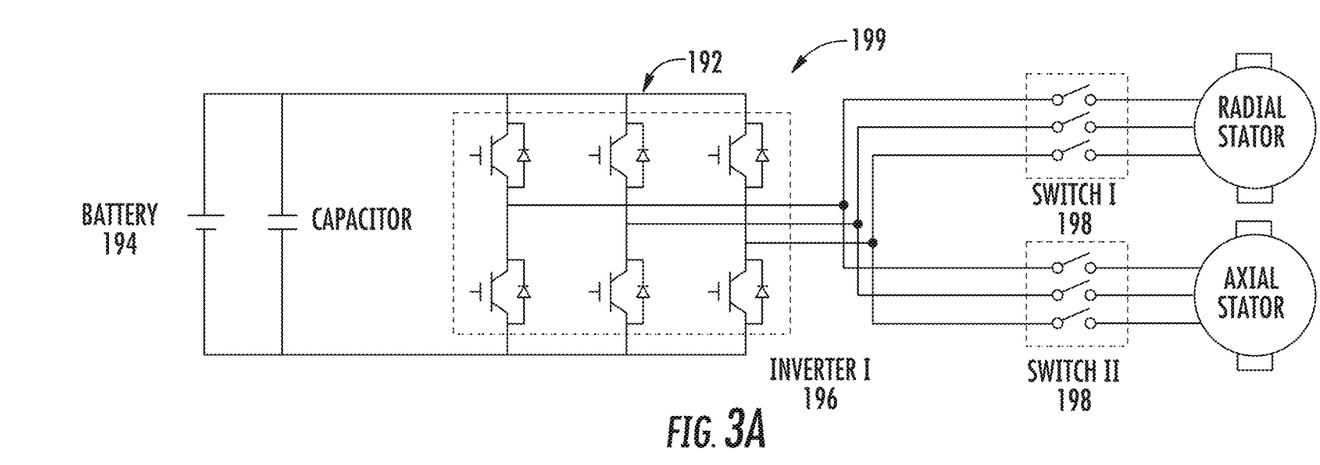
FIGS. 3A and 3B are schematic circuit diagrams of the control system of the electric motor, in accordance with the implementation of FIGS. 1A-C and 2.
Figure 3B:
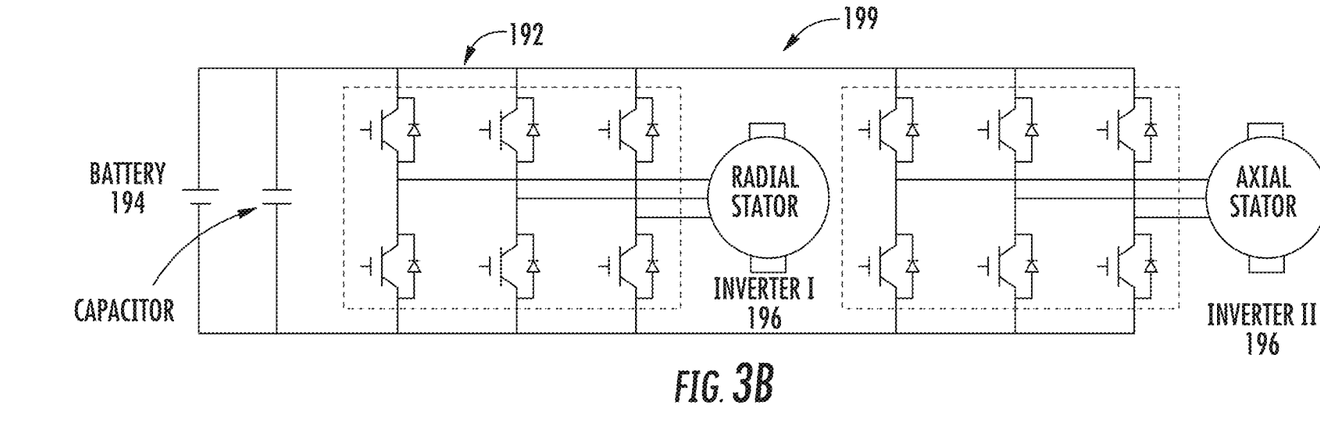

FIGS. 3A and 3B illustrate a schematic circuit diagram for the control system 199 of the electric motor 100 for energizing the radial stator 110 and the axial stator 130. The electric motor 100 can be operated with either one inverter 196 and two three-phase switches 198 or with two inverters 196. FIG. 3A shows the electric motor 100 being operated with one inverter 196, in which the radial stator 110 is energized when switch I is closed and switch II is opened, while the axial stator 130 is energized when switch I is opened and switch II is closed. As for the two-inverter circuit shown in FIG. 3B, each inverter 196 controls the current flow to the radial stator 110 and the axial stator 130 independently.

Because the radial stator 110 and outer magnets 182 are further from the rotor axis 152 than the axial stator 130 and inner magnets 172, operation of the radial stator 110 provides higher torque and lower speeds than operation of the axial stator 130. Thus, shifting of the electric motor 100 between low-speed and high-speed regions can maximize the motor efficiency. The above described electric motor 100 allows for two high-efficiency regions (above 92%)—one at low speeds and one at high speeds. Thus, by shifting between the high efficiency regions of the electric motor 100 during driving, an energy-efficient EV can be realized.

Figure 4A:
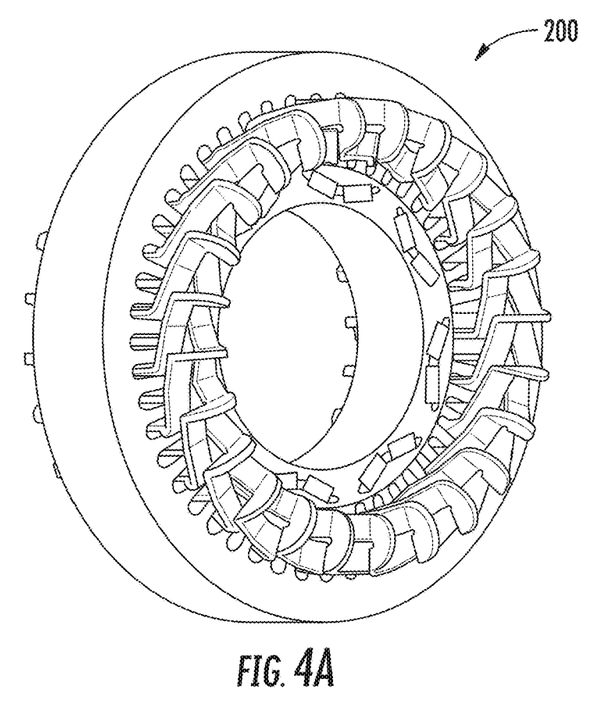
FIGS. 4A and 4B are perspective views of a separated radial permanent magnet synchronous motor ("R-PMSM") and a separated axial permanent magnet synchronous motor ("A-PMSM") of the prior art, respectively.
Figure 4B:
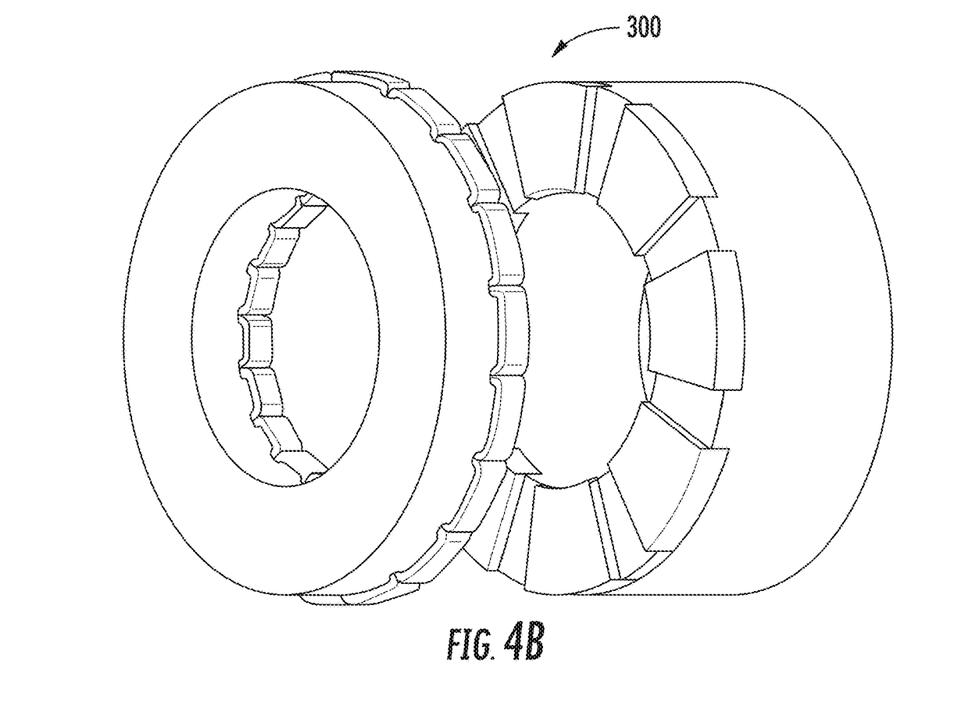

To assess the effectiveness of employing two stators, the performance of the ES-RA-HPMSM electric motor 100 described above was compared with a corresponding, separated radial permanent magnet synchronous motor 200 ("R-PMSM") and a corresponding, separated axial permanent magnet synchronous motor 300 ("A-PMSM"). FIG. 4A shows an example R-PMSM 200, and FIG. 4B shows an example A-PMSM 300. Table I summarizes the specifications of the R-PMSM 200 and the A-PMSM 300. The same PM dimensions, described above with respect to the ES-RA-HPMSM electric motor 100, are used for the R-PMSM 200 and A-PMSM 300.

TABLE I

| Parameter | R-PMSM | A-PMSM |
|---|---|---|
| Stator outer/inner diameter [mm] | 282.4/170 | 133.3/73.5 |
| Rotor outer/inner diameter [mm] | 168.5/124 | 133.3/73.5 |
| Stator/rotor stack length [mm] | 100/100 | 30/100 |
| Winding Type | 3ϕ-distributed | 3ϕ-concentrated |
| # of slots or poles | 48 slots | 18 slots |
| # of turns | 11 | 30 |
| Battery voltage [V] | 500 | |
| Peak current [$A_{rms}$] | 177 | 72 |
| Core material | Non-oriented M19-29G | |

For the evaluation of the performance of an electric motor used in an EV, the most frequently used torque and speed operating regions for city (Urban Dynamometer Driving Condition), aggressive (US06), and highway (Highway Fuel Economy Test) drive cycles are defined and listed in Table II. In this evaluation, the final drive ratio of 7.5 and vehicle mass of 1,500 kg are used, which are a typical drive ratio and weight of an electric vehicle.

TABLE II

| Drive Cycle | Torque range (Nm) | Speed range (rpm) | Highlighted color in Figures |
|---|---|---|---|
| City (1) | 240-250 | 1800-2800 | Green |
| City (2) | 35-45 | 1800-2800 | Blue |
| Aggressive | 322-354 | 1000-2500 | Cyan |
| Highway | 20-35 | 6000-8000 | Yellow |

Figure 5A:
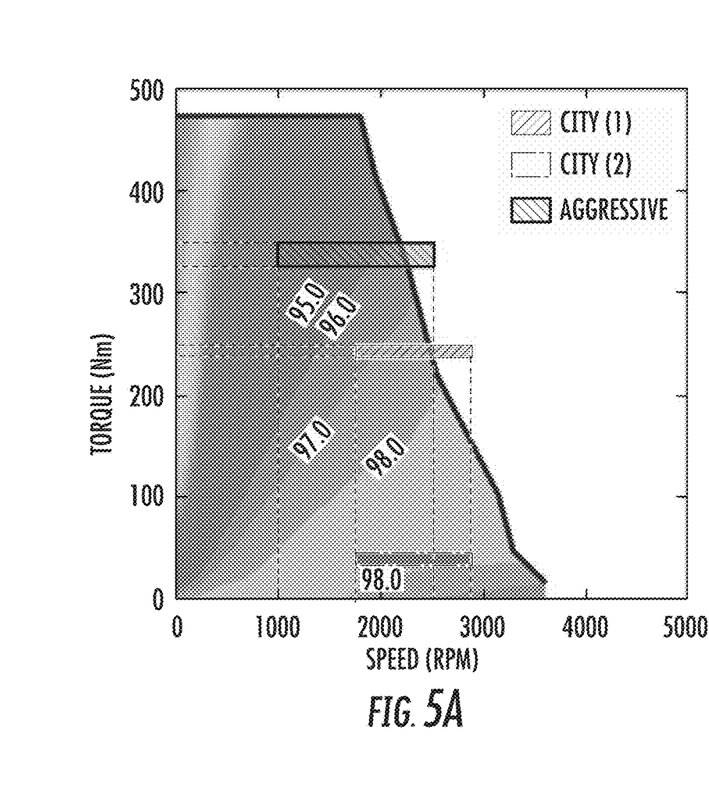
FIGS. 5A and 5B are graphs of the simulated torque/speed characteristics and efficiency map of the R-PMSM and the electric motor of FIGS. 1A-C with the radial stator energized, respectively.
Figure 5B:
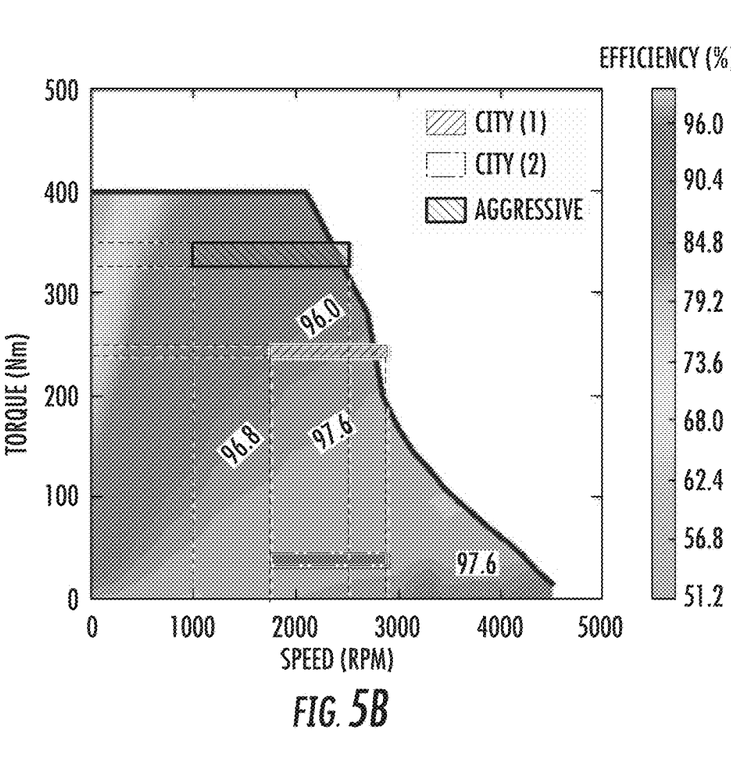

FIG. 5A shows the simulated torque/speed characteristics and efficiency map of the R-PMSM 200, and FIG. 5B shows the simulated torque/speed characteristics and efficiency map of the ES-RA-HPMSM electric motor 100 with the radial stator 110 energized. Although the R-PMSM 200 can only produce torque from 1000-2250 RPM in the aggressive drive cycle and 1800-2500 RPM in the city drive cycle, the ES-RA-HPMSM electric motor 100 with the radial stator 110 energized can produce torque from 1000-2400 RPM in the aggressive drive cycle and from 1800-2700 RPM in the city drive cycle. Furthermore, the ES-RA-HPMSM electric motor 100 exhibits 20% higher maximum speed than the R-PMSM 200 with slight decrease in maximum torque (~15% lower) and efficiency (~0.8% lower in city and 3% aggressive drive cycle).

Figure 6A:
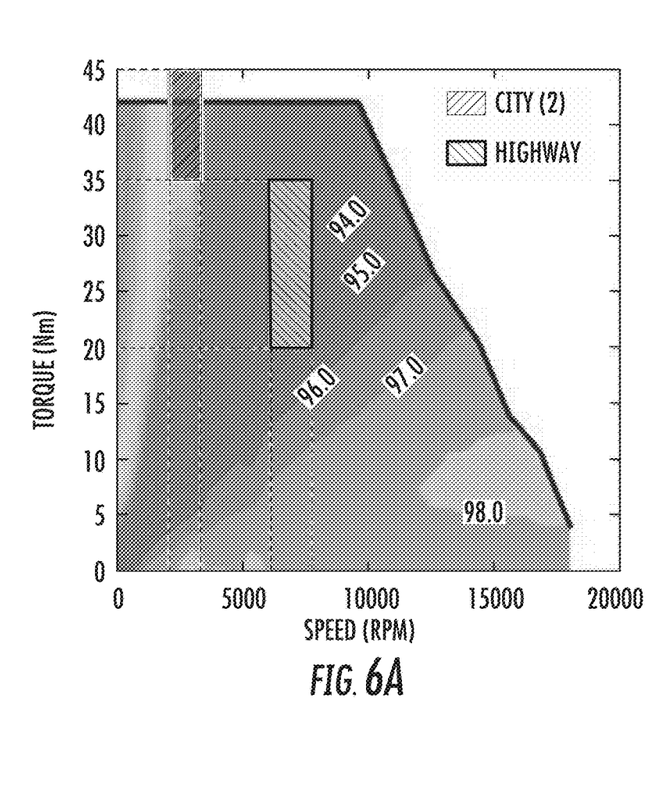
FIGS. 6A and 6B are graphs of the simulated torque/speed characteristics and efficiency map of the A-PMSM and the electric motor of FIGS. 1A-C with the axial stator energized, respectively.
Figure 6B:
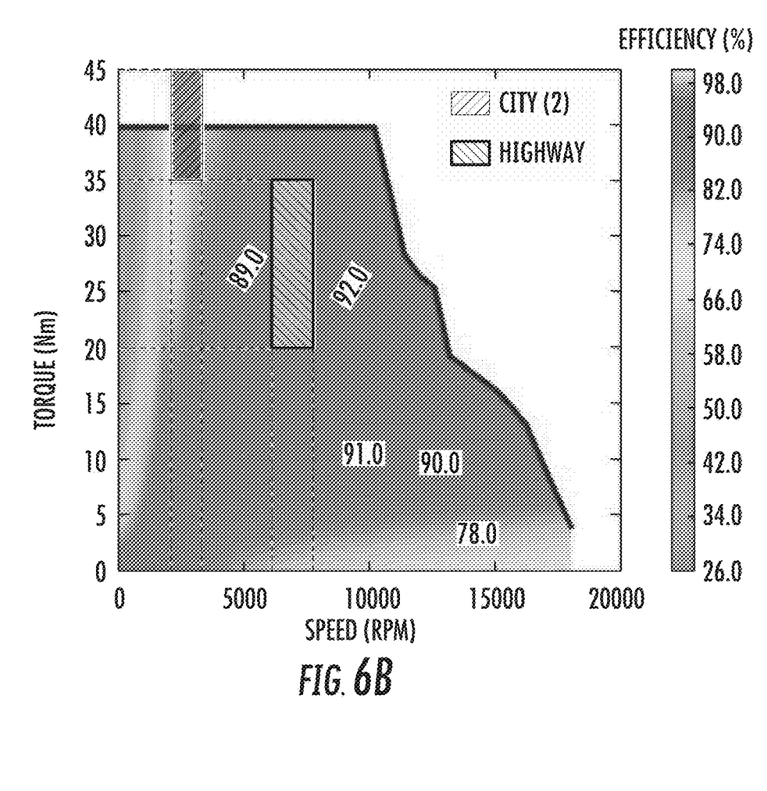
Figure 7:
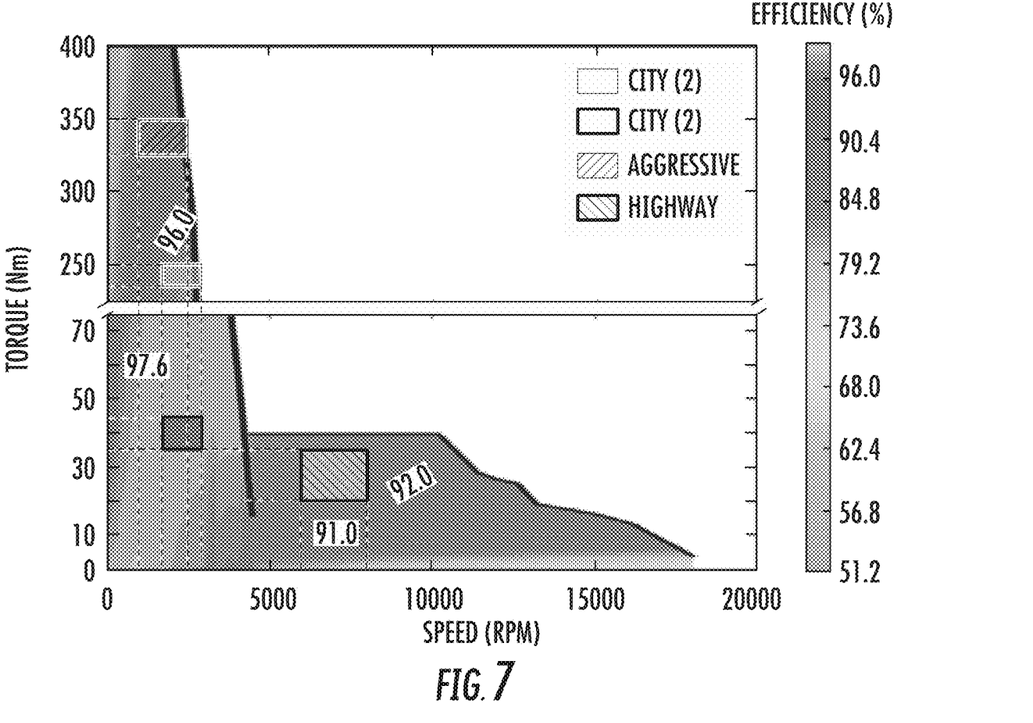
FIG. 7 is a graph of the combined efficiency map with torque and speed characteristics of the electric motor of FIGS. 1A-C with the radial stator energized and with the axial stator energized.

FIG. 6A shows the simulated torque/speed characteristics and efficiency map of the A-PMSM 300, and FIG. 6B shows the simulated torque/speed characteristics and efficiency map of the ES-RA-HPMSM electric motor 100 with the axial stator 130 energized. The ES-RA-HPMSM electric motor 100 with the axial stator 130 energized shows a slightly lower efficiency (~1% lower) and maximum torque (~2 Nm lower) in both driving conditions compared with the A-PMSM 300. Significant advantages of the ES-RA-HPMSM electric motor 100 are observed when the performances with the axial stator 130 energized and radial stator 110 energized are compared with those of the R-PMSM 200 and A-PMSM 300, respectively. It is noted that the ES-RA-HPMSM electric motor 100 with the axial stator 130 energized allows the ES-RA-HPMSM electric motor 100 not only to exhibit significantly higher maximum speed (500%) than the R-PMSM 200, but also to operate in the highway drive cycle. With the radial stator 110 energized, the ES-RA-HPMSM electric motor 100, compared to the A-PMSM 300, shows 1000% and 29% improvement in maximum torque and city efficiency and can operate in both city and aggressive drive cycles, which could not be achieved with the R-PMSM 200. Thus, the results confirm that the ES-RA-HPMSM electric motor 100 has significantly better performance in every aspect with slight decrease in efficiency than the R-PMSM 200 and A-PMSM 300. Table III summarizes the performance of the R-PMSM 200, A-PMSM 300, and the ES-RA-HPMSM electric motor 100 with the radial stator 110 energized and axial stator 130 energized. FIG. 7 shows the combined efficiency map with torque and speed characteristics of the ES-RA-HPMSM electric motor 100 with the radial stator 110 energized and axial stator 130 energized.

TABLE III

| | Separated Radial PMSM | Separated Axial PMSM | ES-RA-HPMSM |
|---|---|---|---|
| City (1) Efficiency [%] | >96.0 | N/A | >95.2 [R-mode] |
| City (2) Efficiency [%] | >98.0 | >69.5 | >97.6 [R-mode] |
| Aggressive Efficiency [%] | >93.0 | N/A | >87.0 [R-mode] |
| Highway Efficiency [%] | N/A | >90.0 | >88.0 [A-mode] |

The electric motor 100 described herein employs two stators with one shared rotor 150, creating two high efficiency regions at both low and high speeds. Thus, the ES-RA-HPMSM electric motor 100 presents an energy efficient motor in changing conditions of rotational speed and torque load to realize an energy-efficient electric motor.

A number of implementations have been described. Nevertheless, it will be understood that various modifications may be made without departing from the spirit and scope of the claims. Accordingly, other implementations are within the scope of the following claims.

Certain terminology is used herein for convenience only and is not to be taken as a limitation on the present claims.

In the drawings, the same reference numbers are employed for designating the same elements throughout the several figures. A number of examples are provided, nevertheless, it will be understood that various modifications can be made without departing from the spirit and scope of the disclosure herein. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. Although the terms "comprising" and "including" have been used herein to describe various implementations, the terms "consisting essentially of" and "consisting of" can be used in place of "comprising" and "including" to provide for more specific implementations and are also disclosed.

What is claimed is:

1. An electric motor, comprising:
   an annular radial stator having a radial stator axis and an opening, the opening having an inner surface and distributed windings disposed along at least the inner surface of the opening of the radial stator;
   an annular axial stator having an axial stator axis, a first side and a second side being spaced apart and opposite each other, and concentrated windings disposed along at least the first side of the axial stator; and
   a rotor having a rotor axis, the rotor comprising two or more magnets, wherein flux from the two or more magnets interacts with one or both of a radial stator magnetic field created by a current flowing through the distributed windings disposed along at least the inner surface of the opening of the radial stator or an axial stator magnetic field created by a current flowing through the concentrated windings disposed along at least the first side of the axial stator,
   wherein the rotor is disposed within the radial stator opening and the axial stator axis and radial stator axis are coincident with the rotor axis and wherein the flux interacting with one or both of the radial stator magnetic field or the axial stator magnetic field turns the rotor about the rotor axis,
   wherein:
      the rotor is cylindrical and has a first end, a second end, an outer surface, and a central opening, the outer surface and the central opening extending between the first end and the second end; and
      the two or more magnets comprise two or more inner magnets and two or more outer magnets,
      each inner magnet being disposed radially between the central opening and the outer surface of the cylindrical rotor and having an outer radial end, the two or more inner magnets being circumferentially space apart, and
      each outer magnet being disposed radially between the outer radial ends of all of the two or more inner magnets and the outer surface of the cylindrical rotor, the two or more outer magnets being circumferentially space apart.

2. The electric motor of claim 1, wherein the rotor defines at least four magnet openings, and the two or more inner magnets and two or more outer magnets are disposed within the two or more magnet openings.

3. The electric motor of claim 2, wherein the two or more outer magnets have magnetic flux directions, the magnetic flux directions having a radial component, wherein the radial component of the magnetic flux directions of the outer magnets within the same opening are both directed radially inwardly or outwardly, and the radial component of the magnetic flux directions of the outer magnets in circumferentially adjacent magnet openings are opposite from each other.

4. The electric motor of claim 3, wherein at least one of the magnet openings is a v-shaped magnet opening, and wherein two outer magnets are disposed within the v-shaped magnet opening.

5. The electric motor of claim 1, wherein the two or more inner magnets have a magnetic flux direction, wherein the magnetic flux direction of the two or more inner magnets are radially directed toward either the first end or the second end of the rotor, and the magnetic flux direction of circumferentially adjacent inner magnets are opposite from each other.

6. The electric motor of claim 1, wherein the two or more inner magnets comprises eight inner magnets.

7. The electric motor of claim 1, wherein the two or more outer magnets comprises sixteen outer magnets.

8. The electric motor of claim 1, wherein the two or more inner magnets are disposed adjacent the concentrated windings of the axial stator.

9. The electric motor of claim 1, wherein the two or more outer magnets are disposed adjacent the distributed windings of the radial stator.

10. The electric motor of claim 1, further comprising a switch for directing current to the distributed windings of the radial stator, the concentrated windings of the axial stator, or both.

11. An electric motor system, comprising:
    an electric motor comprising,
       an annular radial stator having a radial stator axis and an opening, the opening having an inner surface and distributed windings disposed along at least the inner surface of the opening of the radial stator;
       an annular axial stator having an axial stator axis, a first side and a second side being spaced apart and opposite each other, and concentrated windings disposed along at least the first side of the axial stator; and
       a rotor having a rotor axis, the rotor comprising two or more magnets, wherein flux from the two or more magnets interacts with one or both of a radial stator magnetic field created by a current flowing through the distributed windings disposed along at least the inner surface of the opening of the radial stator or an axial stator magnetic field created by a current flowing through the concentrated windings disposed along at least the first side of the axial stator,
       wherein the rotor is disposed within the radial stator opening and the axial stator axis and radial stator axis are coincident with the rotor axis and wherein the flux interacting with one or both of the radial stator magnetic field or the axial stator magnetic field turns the rotor about the rotor axis,
       wherein:
          the rotor is cylindrical and has a first end, a second end, an outer surface, and a central opening, the outer surface and the central opening extending between the first end and the second end; and
          the two or more magnets comprise two or more inner magnets and two or more outer magnets,
          each inner magnet being disposed radially between the central opening and the outer surface of the cylindrical rotor and having an outer radial end, the two or more inner magnets being circumferentially space apart, and each outer magnet being disposed radially between the outer radial ends of all of the two or more inner magnets and the outer surface of the cylindrical rotor, the two or more outer magnets being circumferentially space apart;

a power system comprising a direct current battery and an inverter for changing the direct current from the battery into alternating current;

a switch for directing the current from the power system to the distributed windings of the radial stator, the concentrated windings of the axial stator, or both; and a control system for controlling the inverter and switch.

12. The electric motor system of claim 11, wherein the rotor defines at least four magnet openings, and the two or more inner magnets and two or more outer magnets are disposed within the two or more magnet openings.

13. The electric motor system of claim 12, wherein the two or more outer magnets have magnetic flux directions, the magnetic flux directions having a radial component, wherein the radial component of the magnetic flux directions of the outer magnets within the same opening are both directed radially inwardly or outwardly, and the radial component of the magnetic flux directions of the outer magnets in circumferentially adjacent magnet openings are opposite from each other.

14. The electric motor system of claim 13, wherein at least one of the magnet openings is a v-shaped magnet opening, and wherein two outer magnets are disposed within the v-shaped magnet opening.

15. The electric motor system of claim 11, wherein the two or more inner magnets have a magnetic flux direction, wherein the magnetic flux direction of the two or more inner magnets are radially directed toward either the first end or the second end of the rotor, and the magnetic flux direction of circumferentially adjacent inner magnets are opposite from each other.

16. The electric motor system of claim 11, wherein the two or more inner magnets comprises eight inner magnets.

17. The electric motor system of claim 11, wherein the two or more outer magnets comprises sixteen outer magnets.

18. The electric motor system of claim 11, wherein the two or more inner magnets are disposed adjacent the concentrated windings of the axial stator.

19. The electric motor system of claim 11, wherein the two or more outer magnets are disposed adjacent the distributed windings of the radial stator.

20. A method, comprising:
providing an electric motor comprising,
an annular radial stator having a radial stator axis and an opening, the opening having an inner surface and distributed windings disposed along at least the inner surface of the opening of the radial stator;
an annular axial stator having an axial stator axis, a first side and a second side being spaced apart and opposite each other, and concentrated windings disposed along at least the first side of the axial stator; and
a rotor having a rotor axis, the rotor comprising two or more magnets, wherein flux from the two or more magnets interacts with one or both of a radial stator magnetic field created by a current flowing through the distributed windings disposed along at least the inner surface of the opening of the radial stator or an axial stator magnetic field created by a current flowing through the concentrated windings disposed along at least the first side of the axial stator,
wherein the rotor is disposed within the radial stator opening and the axial stator axis and radial stator axis are coincident with the rotor axis and wherein the flux interacting with one or both of the radial stator magnetic field or the axial stator magnetic field turns the rotor about the rotor axis,
wherein:
the rotor is cylindrical and has a first end, a second end, an outer surface, and a central opening, the outer surface and the central opening extending between the first end and the second end; and
the two or more magnets comprise two or more inner magnets and two or more outer magnets,
each inner magnet being disposed radially between the central opening and the outer surface of the cylindrical rotor and having an outer radial end, the two or more inner magnets being circumferentially space apart, and
each outer magnet being disposed radially between the outer radial ends of all of the two or more inner magnets and the outer surface of the cylindrical rotor, the two or more outer magnets being circumferentially space apart;
energizing one of the radial stator and the axial stator; and
energizing the other of the radial stator and the axial stator.

21. The method of claim 20, further comprising the step of deenergizing the one of the radial stator and the axial stator before the step of energizing the other of the radial stator and the axial stator.

22. The method of claim 20, wherein the radial stator is energized before the axial stator is energized.

23. The method of claim 20, wherein the axial stator is energized before the radial stator is energized.

24. The method of claim 20, wherein both the radial stator and the axial stator are energized at the same time.

25. The method of claim 20, wherein the electric motor further comprises a radial switch for energizing the radial stator and an axial switch for energizing the axial stator.

26. The method of claim 20, wherein the rotor defines at least four magnet openings, and the two or more inner magnets and two or more outer magnets are disposed within the two or more magnet openings.

27. The method of claim 26, wherein the two or more outer magnets have magnetic flux directions, the magnetic flux directions having a radial component, wherein the radial component of the magnetic flux directions of the outer magnets within the same opening are both directed radially inwardly or outwardly, and the radial component of the magnetic flux directions of the outer magnets in circumferentially adjacent magnet openings are opposite from each other.

28. The method of claim 27, wherein at least one of the magnet openings is a v-shaped magnet opening, and wherein two outer magnets are disposed within the v-shaped magnet opening.

29. The method of claim 20, wherein the two or more inner magnets have a magnetic flux direction, wherein the magnetic flux direction of the two or more inner magnets are radially directed toward either the first end or the second end of the rotor, and the magnetic flux direction of circumferentially adjacent inner magnets are opposite from each other.

30. The electric motor system of claim 20, wherein the two or more inner magnets comprises eight inner magnets.

31. The method of claim 20, wherein the two or more outer magnets comprises sixteen outer magnets.

32. The method of claim 20, wherein the two or more inner magnets are disposed adjacent the concentrated windings of the axial stator.

33. The method of claim 20, wherein the two or more outer magnets are disposed adjacent the distributed windings of the radial stator.

* * * * *